US009131391B2

(12) United States Patent
Madan et al.

(10) Patent No.: US 9,131,391 B2
(45) Date of Patent: Sep. 8, 2015

(54) DYNAMIC CHANNEL SELECTION ALGORITHMS FOR INTERFERENCE MANAGEMENT IN WIFI NETWORKS

(71) Applicant: wildfire.exchange, inc., San Francisco, CA (US)

(72) Inventors: Ritesh K. Madan, Jersey City, NJ (US); Vikram Chandrasekhar, Mountain View, CA (US); Andrea Goldsmith, Menlo Park, CA (US); Santhosh Krishna, Sunnyvale, CA (US)

(73) Assignee: wildfire.exchange, inc., San Francisco, CA (US)

( * ) Notice: Subject to any disclaimer, the term of this patent is extended or adjusted under 35 U.S.C. 154(b) by 61 days.

(21) Appl. No.: 13/958,853

(22) Filed: Aug. 5, 2013

(65) Prior Publication Data
US 2014/0036816 A1   Feb. 6, 2014

Related U.S. Application Data

(60) Provisional application No. 61/680,169, filed on Aug. 6, 2012, provisional application No. 61/698,426, filed on Sep. 7, 2012, provisional application No. 61/705,076, filed on Sep. 24, 2012.

(51) Int. Cl.
*H04W 24/02* (2009.01)
*H04W 24/10* (2009.01)
(Continued)

(52) U.S. Cl.
CPC .............. *H04W 24/02* (2013.01); *H04W 16/14* (2013.01); *H04W 24/10* (2013.01); *H04W 84/12* (2013.01); *H04W 88/08* (2013.01)

(58) Field of Classification Search
CPC ...... H04W 24/00; H04W 24/01; H04W 24/02; H04W 24/03; H04W 24/04; H04W 72/04; H04W 72/05; H04W 72/06
USPC .......... 370/328, 252, 445, 329, 347, 348, 342
See application file for complete search history.

(56) References Cited

U.S. PATENT DOCUMENTS 7,315,533 B2   1/2008   Theobold et al.
7,414,978 B2   8/2008   Lun et al.
(Continued)

FOREIGN PATENT DOCUMENTS

WO   2012016187   2/2012
WO   2013043869   3/2013

OTHER PUBLICATIONS

Akhshabi et al., "An Experimental Evaluation of Rate-Adaptation Algorithms in Adaptive Streaming over HTTP", MMSys' 11, Feb. 23-25, 2011, San Jose, CA.
(Continued)

*Primary Examiner* — Dady Chery
(74) *Attorney, Agent, or Firm* — Van Pelt, Yi & James LLP

(57) ABSTRACT

A method of dynamically adjusting Wi-Fi parameters of a plurality of access points (APs) is disclosed. Reports from the plurality of APs are received through an interface. A conflict graph is created by a processor. Creating the conflict graph includes creating a plurality of vertices of the conflict graph, each vertex corresponding to one of the plurality of APs. Creating the conflict graph further includes determining that there is a conflict between at least some of the pairs of APs based at least in part on the received reports. Creating the conflict graph includes connecting an edge between each of the at least some of the pairs of APs. The conflict graph is stored in a memory.

27 Claims, 18 Drawing Sheets

(51) Int. Cl.
*H04W 16/14* (2009.01)
*H04W 84/12* (2009.01)
*H04W 88/08* (2009.01)

(56) References Cited

U.S. PATENT DOCUMENTS

| | | | |
|---|---|---|---|
| 7,953,403 B2 | 5/2011 | Nientiedt | |
| 8,681,810 B2 | 3/2014 | Nandagopalan et al. | |
| 8,750,894 B1 | 6/2014 | Stogaitis et al. | |
| 8,798,021 B2 | 8/2014 | Mangalvedhe et al. | |
| 2006/0258395 A1 | 11/2006 | Cave et al. | |
| 2007/0149172 A1 | 6/2007 | Dickinson et al. | |
| 2007/0242621 A1* | 10/2007 | Nandagopalan et al. | 370/254 |
| 2008/0090575 A1 | 4/2008 | Barak et al. | |
| 2009/0257380 A1* | 10/2009 | Meier | 370/329 |
| 2009/0279427 A1 | 11/2009 | Ji et al. | |
| 2009/0316585 A1 | 12/2009 | Srinivasan et al. | |
| 2009/0323632 A1 | 12/2009 | Nix | |
| 2010/0029282 A1 | 2/2010 | Stamoulis et al. | |
| 2010/0167777 A1 | 7/2010 | Raghothaman et al. | |
| 2011/0039554 A1 | 2/2011 | Bims | |
| 2011/0151886 A1 | 6/2011 | Grayson et al. | |
| 2012/0002567 A1 | 1/2012 | Sun et al. | |
| 2012/0009909 A1 | 1/2012 | Lau | |
| 2012/0087268 A1 | 4/2012 | Savoor et al. | |
| 2012/0088482 A1 | 4/2012 | Pazhyannur et al. | |
| 2012/0122503 A1 | 5/2012 | Ma et al. | |
| 2012/0257585 A1 | 10/2012 | Sydor et al. | |

OTHER PUBLICATIONS

Chambelin et al., "Evaluation of neighbors impact on channel allocation for dense environment and Video use cases", Jan. 17, 2011.
"Cisco Visual Networking Index:Global Mobile Data Traffic Forecast Update, 2012-2017", Cisco White Paper, Feb. 6, 2013.
Donald C. Cox, "Wireless Network Access for Personal Communications", IEEE Communication Magazine, Dec. 1992, pp. 96-115.
Neil Hughes, "iPhone 4 keynote plagued by high-tech Wi-Fi meltdown", Jun. 7, 2010, http://www.appleinsider.com/articles/10/06/07/iphone_4_keynote_plagued_by_high_tech_wi_fi_meltdown/.
Jamieson et al., "Understanding the Real-World Performance of Carrier Sense", SIGCOMM'05 Workshops, Aug. 22-26, 2005, Philadelphia, PA.
Kaynia et al., "Improving the Performance of Wireless Ad Hoc Networks Through MAC Layer Design", IEEE Transcations on Wireless Communications, vol. 10, No. 1, Jan. 2011.
Zheng et al., "Diversity and Multiplexing: A Fundamental Tradeoff in Multiple Antenna Channels", IEEE Transactions on Information Theory, vol. 1, No. 8, Aug. 2002.

* cited by examiner

Mixed Integer Linear Program

Problem Data: N APs, M Channels (a) E Contains the set of Edges, Where Edge (i, k) Implies APs i and k Cannot Transmit Simultaneously (b) $N(i)$ is Number of Edges from SoN APs in E Which Terminate at AP i (c) $C(i, j)$ is the Number of Non-SON APs Which Contend with AP i on Channel j (d) $d^{max}$ is Maximum Degree Allowed on any Channel (e) H Contains the set of Edges, where Edge (i, k) Implies APs i and k are Hidden Nodes to Each Other Optimization Variables:

$x(i, j)$ is 1 If AP i is on Channel j, and 0 Otherwise
$d(i, j)$ is Degree of Contention Graph at AP i on Channel i Min. $\sum_i \sum_j d(i,j)$ Subject to $\sum_j d(i,j) \leq d^{max}, \; i = 1,...,N$ $\sum_{k:(i,k) \in E} x(k,j) + x(i,j) C(i,j) \leq d(i,j) + (1-x(i,j)) N(i),$
$\quad i=1,...,N, \; j=1,...,M$ $\sum_j x(i,j) = 1, \; i = 1,...,N$ $x(i,j) + x(k,j) \leq 1, (i,k) \in H, \; j=1,...,M$
$x(i,j) \in \{0,1\}, \; d(i,j) \geq 0, \; i=1,...,N, j=1,...,M$

FIG. 15

DYNAMIC CHANNEL SELECTION ALGORITHMS FOR INTERFERENCE MANAGEMENT IN WIFI NETWORKS

CROSS REFERENCE TO OTHER APPLICATIONS

This application claims priority to U.S. Provisional Patent Application No. 61/680,169 entitled DYNAMIC CHANNEL SELECTION ALGORITHMS FOR INTERFERENCE MANAGEMENT IN WIFI NETWORKS filed Aug. 6, 2012 which is incorporated herein by reference for all purposes, U.S. Provisional Patent Application No. 61/698,426 entitled DYNAMIC CHANNEL SELECTION IN WI-FI NETWORKS filed Sep. 7, 2012 which is incorporated herein by reference for all purposes, and U.S. Provisional Patent Application No. 61/705,076 entitled POWER CONTROL AND CARRIER-SENSE THRESHOLD OPTIMIZATION IN SON-FOR-WIFI filed Sep. 24, 2012 which is incorporated herein by reference for all purposes.

BACKGROUND OF THE INVENTION

Wi-Fi networks are increasingly used for high-speed wireless connectivity in the home, office, and in public hotspots. Wi-Fi networks are designed based on the family of IEEE 802.11 Wi-Fi standards, including the early 802.11a/b/g standards, the current 802.11n standard, and the next-generation 802.11 ac standard, which provides for peak data rates exceeding 1 Gigabits per second (Gbps). These standards have been designed to target access points (APs) with relatively small coverage areas and low-density deployments. In dense deployments, the interference between the APs can be severe, and the Wi-Fi standards lack sophisticated mechanisms to mitigate the interference. As a consequence, in dense deployments current Wi-Fi systems may exhibit poor spectrum reuse and significant contention among APs and their associated clients, resulting in low throughput and poor end-user experience.

BRIEF DESCRIPTION OF THE DRAWINGS

Various embodiments of the invention are disclosed in the following detailed description and the accompanying drawings.

FIG. 15 illustrates one embodiment of mixed integer linear programming that can be used to minimize the total sum of the weighted degrees of the conflict graph by dynamically adjusting the channel allocation of the APs.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
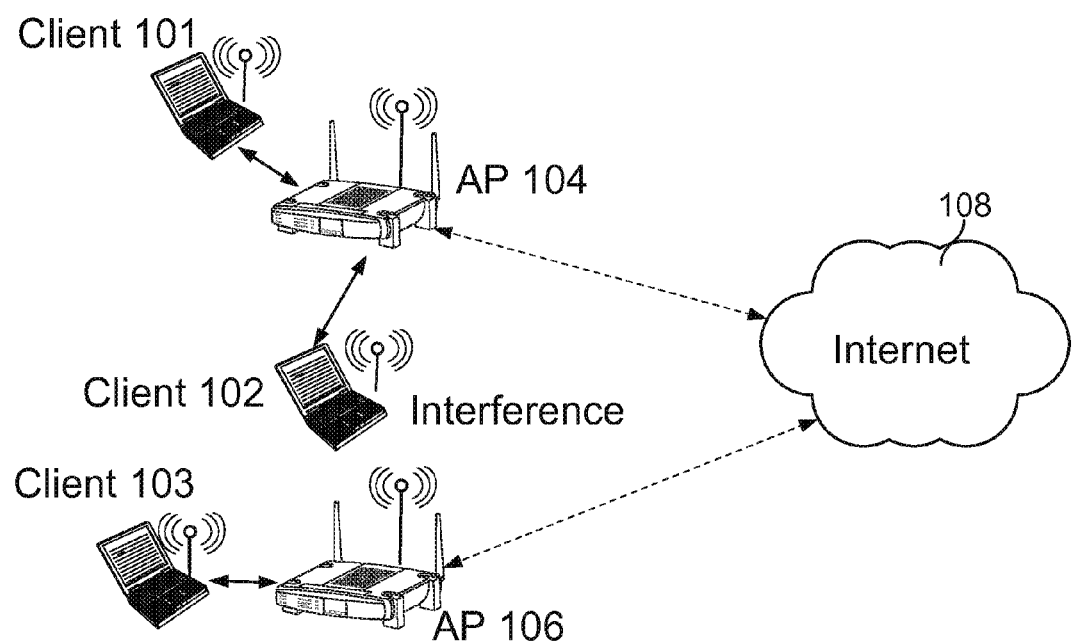
FIG. 1 illustrates a Wi-Fi network, in which a Wi-Fi-enabled client, client 101, client 102, or client 103, may connect to any authorized AP (104 or 106) when the client is within the AP's coverage area.

Wi-Fi networks are formed using one or more Wi-Fi APs, which can be deployed in homes, apartments, office buildings, and as outdoor hotspots. FIG. 1 illustrates a Wi-Fi network, in which a Wi-Fi-enabled client, client 101, client 102, or client 103, may connect to any authorized AP (104 or 106) when the client is within the AP's coverage area. Once a client is within the coverage area of a particular AP, the signal received by the client generally has a signal strength above the level required for connectivity to that AP. However, clients close to the AP typically receive stronger AP signals than clients farther away from the AP, and enjoy superior performance commensurate with the greater signal strength. APs are connected to the backbone Internet 108, with traffic routed to and from their clients via standard Internet protocols. When a client is within the coverage areas of multiple APs, the AP for the Wi-Fi connection is typically selected based on static client preferences (e.g., a preferred service set ID or SSID) or signal strength. For example, client 102 in FIG. 1 is within the coverage areas of two APs (AP 104 and AP 106), but client 102 may connect to AP 104 based on its preferred SSID. Wi-Fi APs operate in both the 2.4 GHz and 5 GHz spectral bands, with channel bandwidths of 20 MHz, 40 MHz, 80 MHz or 160 MHz, depending on the particular Wi-Fi standard used.

One way to reduce interference experienced by the clients in a Wi-Fi network is via channel allocation. FIG. 1 illustrates that clients connected to a particular AP may experience interference caused by other APs within the Wi-Fi network. The wireless channels in a Wi-Fi network are shared across all APs and their clients. When a given channel is used simultaneously by different APs with overlapping coverage areas, the APs create interference to each other's clients, as shown in FIG. 1. The amount of interference depends on many factors, including the propagation conditions, the carrier frequency, and the distance between the interfering AP and the client. The channel allocation mechanism in 802.11 attempts to avoid such interference by assigning different channels to APs within close proximity to each other; this channel assignment may be done manually or based on local measurements. With this orthogonal frequency reuse, the APs use different frequencies, and inter-AP interference is minimized. While this channel allocation works well for avoiding interference in low-density AP deployments, in dense deployments there are not enough channels for this method to be viable. For example, only three non-overlapping channels are available in the 2.4 GHz band, making it difficult, and at times impossible, for APs with overlapping coverage areas operating in this band to each be assigned a unique channel.

To mitigate co-channel interference between APs relatively close to each other that are operating on the same channel, a second interference mitigation mechanism—carrier sense multiple access with collision avoidance (CSMA/CA)—is used. CSMA/CA avoids simultaneous transmissions by two APs on the same channel by staggering the two APs' transmissions in time. Prior to transmitting a frame, an AP monitors the wireless channel for other Wi-Fi transmissions with received power exceeding a given carrier sense threshold (CST). The CST defines a carrier sense radius around each receiving device: if all transmitters transmit at the same power, then a transmission from any transmitter within the circle will lead to the medium being detected as busy at the receiving device. The carrier sense radius as a function of azimuthal angle traces out a circle in ideal free-space propagation. In more typical operating environments, the radius as a function of azimuthal angle will have an irregular shape, due to the different shadowing and multipath experienced at different client locations. A random back-off timer based mechanism ensures that listening devices that detect the channel as occupied will not all simultaneously attempt to transmit as soon as the channel becomes unoccupied.

Figure 2A:
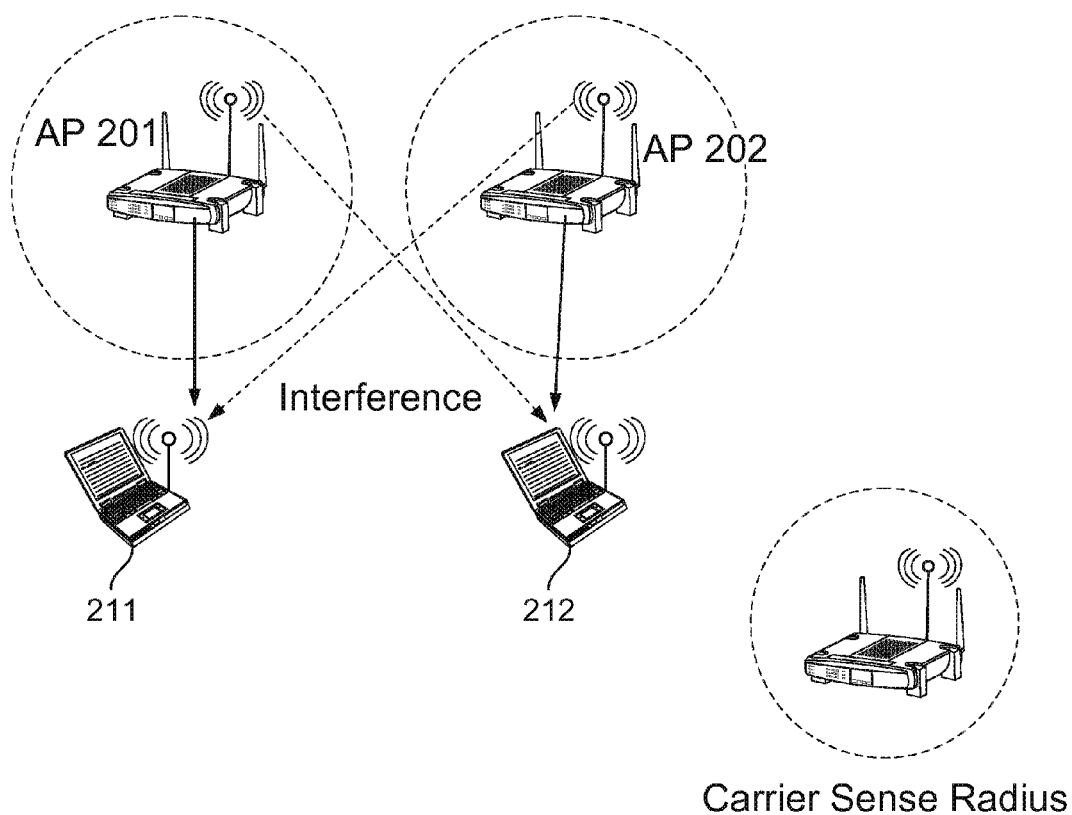
FIG. 2A illustrates that when the carrier sense threshold (CST) is high, the carrier sense radius is small.
Figure 2B:
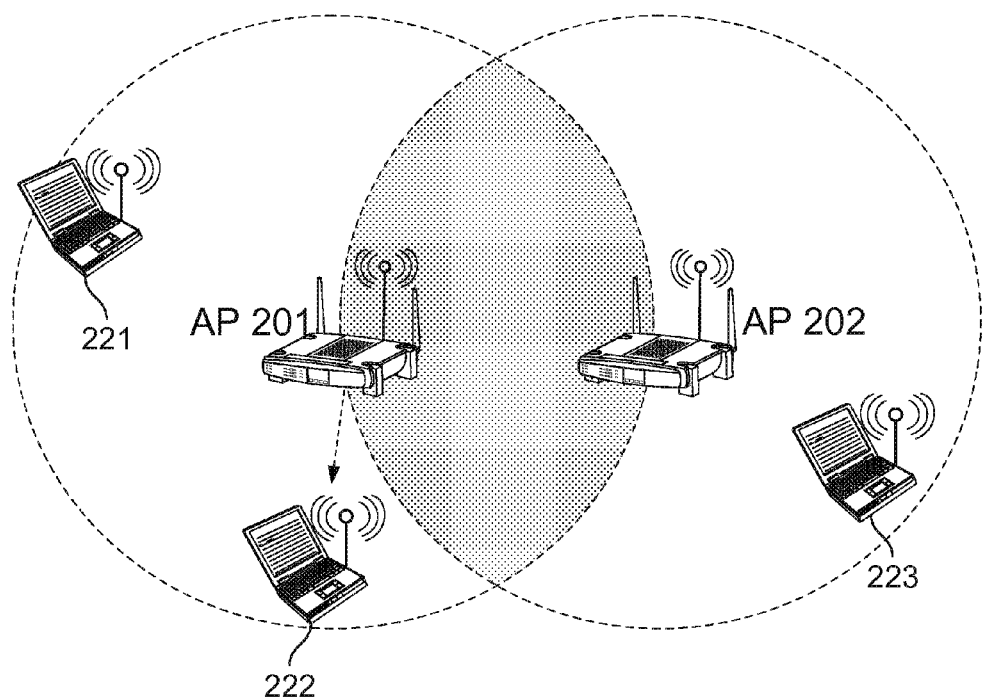
FIG. 2B illustrates that when the CST is low, the carrier sense radius is large.

Carrier sensing generally works well in low density deployments of APs, where there are sufficient channels to avoid interference between APs, and hence aggressive frequency reuse is not needed. However, in dense deployments, with neighboring APs using the same channel, carrier sensing induces a tradeoff between aggressive frequency reuse and higher levels of interference, as illustrated in FIGS. 2A and 2B. In FIG. 2A, when the CST is high, the carrier sense radius is small. Hence AP 201 and AP 202 will transmit simultaneously, causing interference to the other AP's client. If this interference does not preclude successful packet reception, then throughput is high; if the interference is sufficiently high so as to cause packet errors, then these packets need to be retransmitted, thereby reducing throughput and increasing delay. In FIG. 2B, when the CST is low, the carrier sense radius is large. This will preclude AP 201 and AP 202 from transmitting simultaneously. If both APs have data to transmit, one will back off, thereby reducing its throughput and increasing delay.

Current Wi-Fi networks use a static CST that can be AP-specific. Selecting static CST rarely optimizes network performance, since whether or not two neighboring APs A and B transmit simultaneously depends on whether the power received from AP A at AP B (and vice versa) is below threshold. This is not the best criterion to use: in particular, packet errors are caused not by the interference between neighboring APs, but by the interference between a given AP and the client associated with the neighboring AP. As shown in FIG. 2B, with a low CST, AP 201 and AP 202 fall within each other's carrier sense radius and hence will never transmit simultaneously. However, since client 221 is far from AP 202, and client 223 is far from AP 201, a transmission from AP 201 to client 221 could occur simultaneously with a transmission from AP 202 to client 223 with minimal interference between them. Fundamentally, whether AP 202 should transmit when AP 201 is transmitting should depend on how that interference impacts the signal received by AP 201's client, i.e. it should depend on the signal-to-interference-plus-noise (SINR) at AP 201's client. In addition to adapting to SINR, CSTs should also adapt to the AP density, as more APs are added to the network, as well as adapt to the client data requirements and changing propagation conditions of APs sharing the same channel. Setting the threshold adaptively can both increase throughput and reduce packet error probability.

In addition to channel allocation and CST settings, other Wi-Fi parameters, e.g., transmit power control parameters, will also affect a Wi-Fi network's overall network performance. For example, reducing transmit power at a given AP reduces interference between the given AP and other devices on the same channel. However, this also reduces SNR (signal-to-noise ratio) and RSSI (receive signal strength indication) between the AP and its connected devices. Thus, transmit power control mechanisms optimize this tradeoff.

Figure 3:
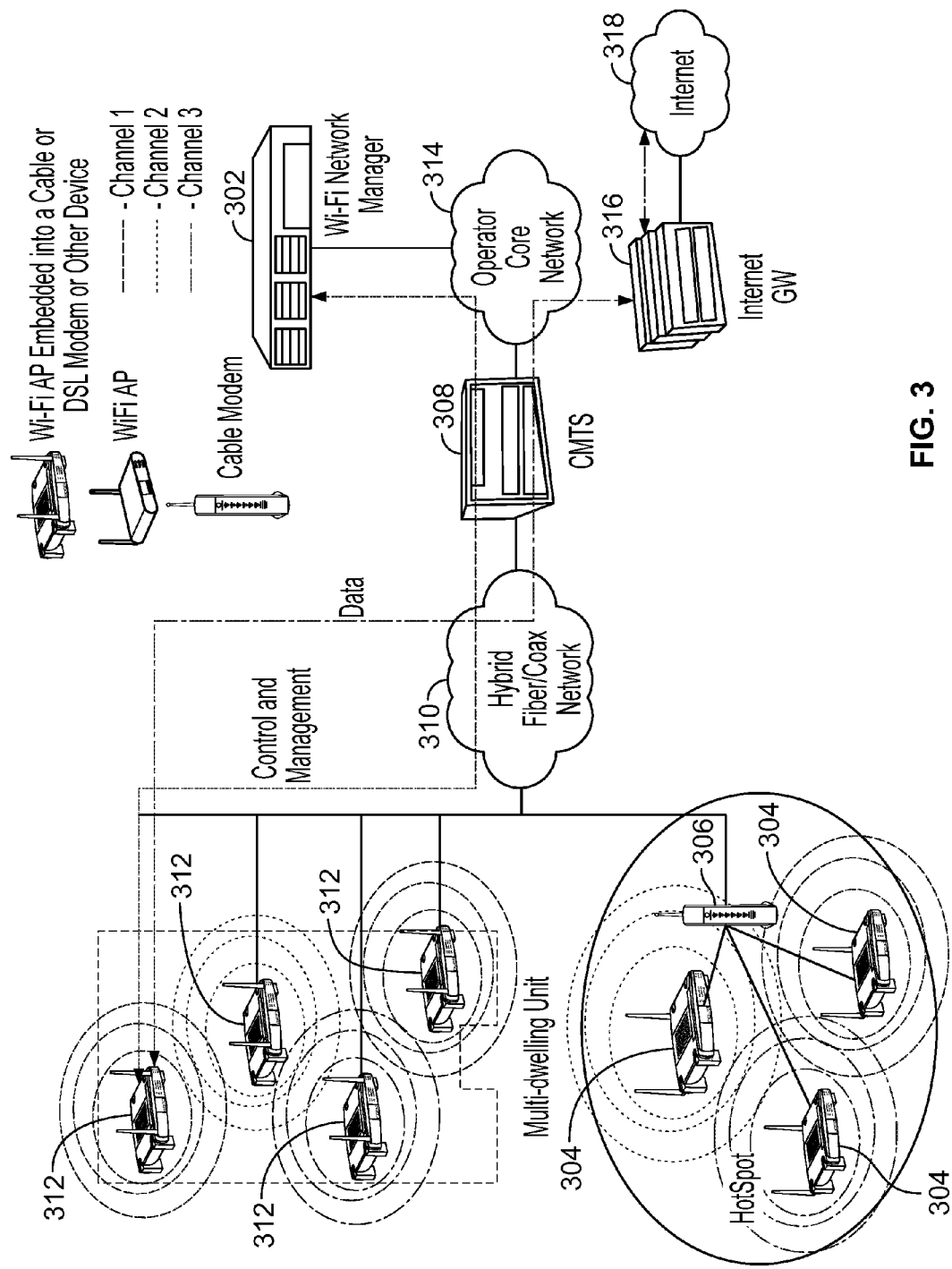
FIG. 3 illustrates an embodiment of a Wi-Fi-network manager for automatically and dynamically configuring and updating Wi-Fi AP parameters in one or more Wi-Fi networks to optimize the overall network performance of the one or more Wi-Fi networks.

FIG. 3 illustrates an embodiment of a Wi-Fi-network manager for automatically and dynamically configuring and updating Wi-Fi AP parameters in one or more Wi-Fi networks to optimize the overall network performance of the one or more Wi-Fi networks. In some embodiments, Wi-Fi network manager 302 connects to the APs and provides service to the APs as a server. In some embodiments, Wi-Fi network manager 302 manages tens of thousands (or more) of APs within the one or more Wi-Fi networks.

FIG. 3 illustrates one exemplary embodiment in which the APs are connected to Wi-Fi network manager 302 and the Internet 318 using cable modems. Note that FIG. 3 is provided as an illustrative example only. Therefore, the present application is not limited to this specific example. For example, the APs managed by Wi-Fi network manager 302 may be connected to Wi-Fi network manager 302 using network technologies other than cable modem technologies, including digital subscriber line (DSL) technologies and other Internet technologies.

As shown in FIG. 3, some of the APs managed by Wi-Fi network manager 302 may be standalone Wi-Fi APs 304. Alternatively, some of the Wi-Fi APs may be embedded into other devices, such as cable modems, DSL modems, and the like. Standalone Wi-Fi APs 304 may be connected to a cable modem 306, and cable modem 306 may be connected to a cable modem termination system (CMTS) 308 via a hybrid fiber-coaxial (HFC) network 310. CMTS 308 may be further connected to Wi-Fi network manager 302 via an operator core network 314. Data packets that are sent from CMTS 308 to the Internet 318 are routed through an Internet Gateway 316. Some APs (312) managed by Wi-Fi network manager 302 may be integrated units, each integrating a cable modem and a Wi-Fi AP as a single unit. Integrated units 312 may be connected to CMTS 308 via HFC network 310.

In some embodiments, a software agent is installed on the APs. For example, a piece of software may be installed on an AP by an end-user or a network administrator. In another example, an application may be downloaded from a website, and the application acts as an agent between the AP and Wi-Fi network manager 302. Wi-Fi network manager 302 may manage, configure, and optimize the parameters of an AP using different interface protocols, including Simple Network Management Protocol (SNMP), Control And Provisioning of Wireless Access Points (CAPWAP), Technical Report 069/181 (TR-069/TR-181), Command-Line Interface (CLI), Extensible Markup Language (XML), and the like.

Figure 4:
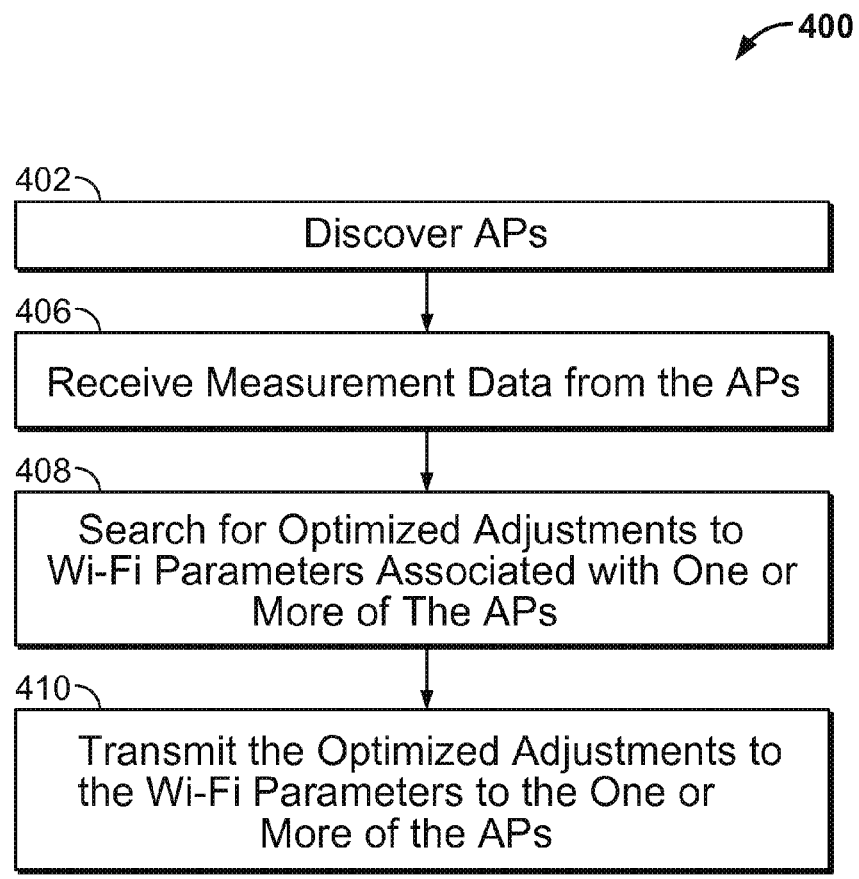
FIG. 4 is a flow chart illustrating an embodiment of a process 400 for automatically and dynamically configuring and updating Wi-Fi AP parameters in one or more Wi-Fi networks to optimize the overall network performance.

FIG. 4 is a flow chart illustrating an embodiment of a process 400 for automatically and dynamically configuring and updating Wi-Fi AP parameters in one or more Wi-Fi networks to optimize the overall network performance. In some embodiments, process 400 is a process that runs on Wi-Fi network manager 302 in FIG. 3.

At 402, the APs that are installed in the Wi-Fi networks managed by Wi-Fi network manager 302 are discovered. Wi-Fi network manager 302 is configured to manage a heterogeneous group of APs. The APs may support different Wi-Fi protocols, including 802.11a, 802.11c, 802.11g, 802.11n, 802.11ac, and the like. The APs can be made by different third-party vendors. Some of the APs may be purchased off-the-shelf. Therefore, the APs that are managed by Wi-Fi network manager 302 have a wide range of capabilities, configurable parameters, and interfaces. Wi-Fi network manager 302 discovers the APs within the Wi-Fi networks, including their capabilities, configurable parameters, interfaces, and the like. This information may be used by Wi-Fi network manager 302 to more optimally search for a set of configurable parameters for any AP managed by Wi-Fi network manager 302 to achieve improved overall network performance.

At 406, measurement data is received by Wi-Fi network manager 302 from the APs that it manages (hereinafter referred to as managed-APs). The measurement data is locally collected by the APs and then sent to Wi-Fi network manager 302. The measurement data collected by an AP may include data regarding the AP's clients. The measurement data collected by an AP may also include data regarding clients connected to neighboring APs that may or may not be APs managed by Wi-Fi-network manager 302. The measurement data may include receive signal strength indication (RSSI), throughput, packet error rate, and the like. RSSI is a measurement of the power present in a received radio signal. In some embodiments, the measurement data is Wi-Fi standard-based measurement data (e.g., 802.11 standard-based measurement data) measured by the APs. In some embodiments, the APs may collect additional measurement data that is optional or not specified in the 802.11 standards.

Figure 5:
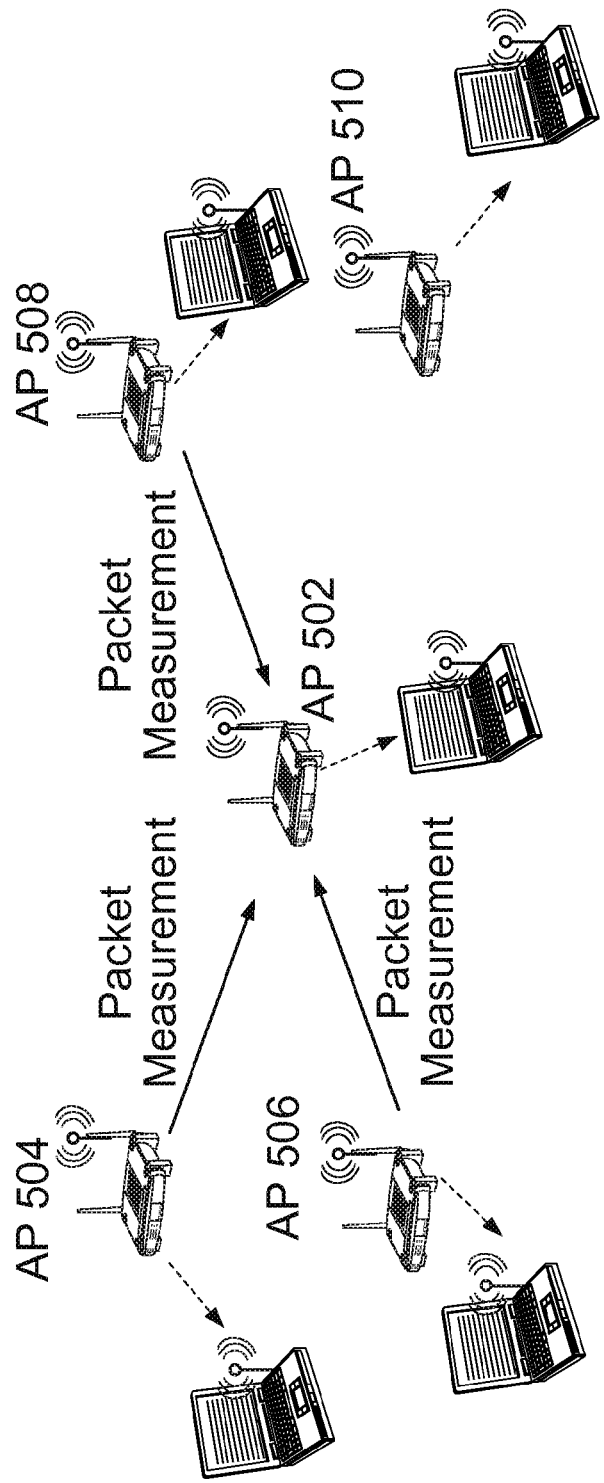
FIG. 5 illustrates an embodiment of how measurement data is locally collected by a managed-AP.

FIG. 5 illustrates an embodiment of how measurement data is locally collected by a managed-AP. AP 502 is an AP managed by Wi-Fi network manager 302. AP 502 can hear from some of its neighboring APs. For example, as shown in FIG. 5, AP 502 can hear from APs 504, 506, and 508, but cannot hear from AP 510. The APs that AP 502 can hear from may be either APs that are managed by Wi-Fi network manager 302 or APs that are not managed by Wi-Fi network manager 302 (hereinafter referred to as non-managed-APs). AP 502 may collect different types of measurement data corresponding to the APs that AP 502 can hear from. For example, AP 502 may measure the RSSI, noise, and SNR of the packets from those APs it can hear from under different conditions and using different configurations, e.g., under different channel assignments, and under different transmit power and CST configurations. In certain modes, e.g. running in a promiscuous mode, AP 502 can further decode those packets to obtain different types of information regarding the packets, including MAC addresses, BSSIDs, MAC packet types, and the like. A basic service set (BSS) is a single AP together with its associated clients. A BSSID uniquely identifies a BSS. In addition to the measurement data described above, a managed-AP may collect additional AP information, including the AP's MAC address, current channel number, current load information, MAC addresses of associated clients, and the like.

Besides other APs, AP 502 can also hear from its own associated clients and also some of the neighboring clients that are not associated with AP 502. AP 502 may similarly collect different types of measurement data corresponding to the clients that AP 502 can hear from, as described above.

Figure 6:
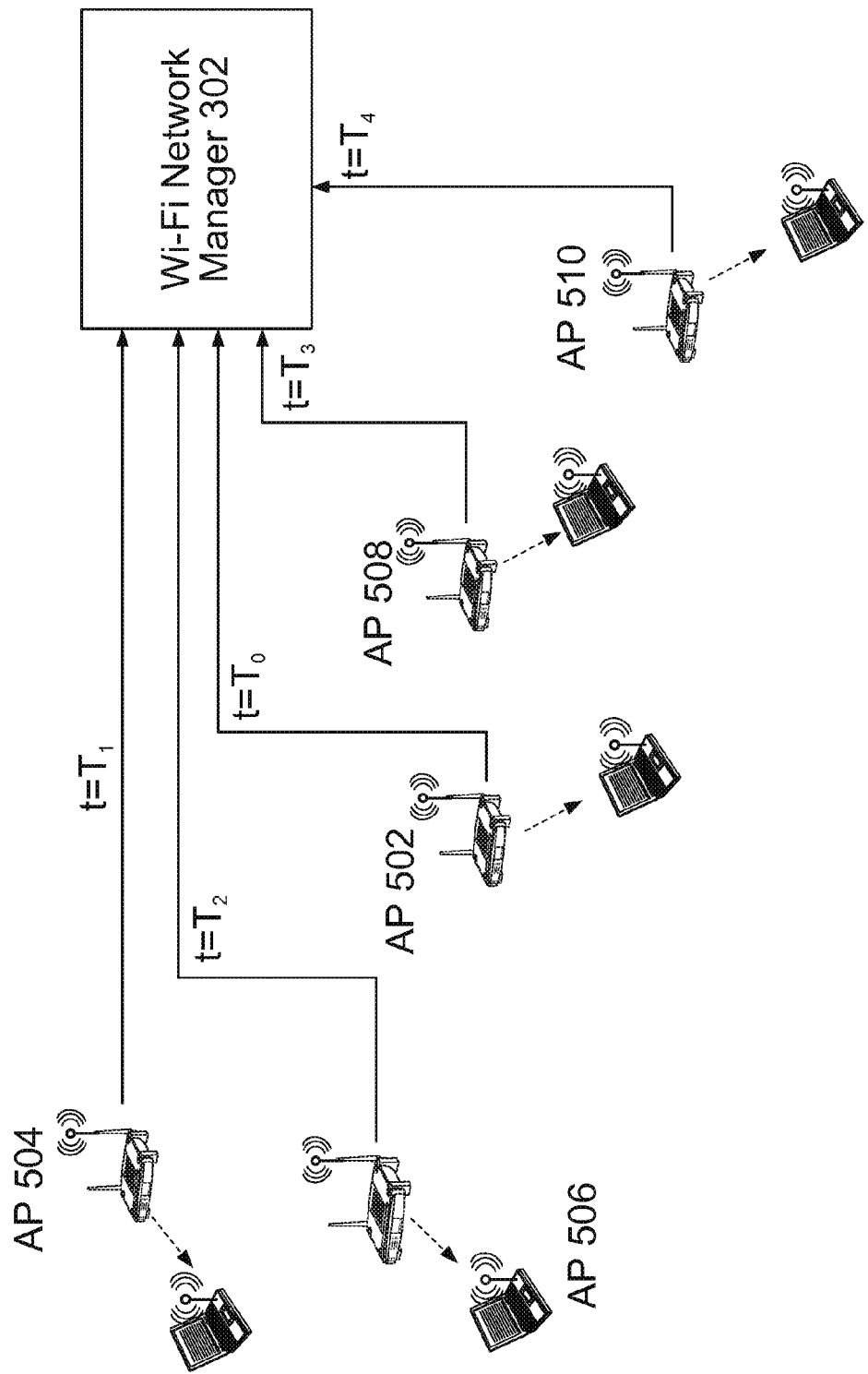
FIG. 6 illustrates an embodiment of how the measurement data and the additional AP information collected by a plurality of managed-APs are further sent to Wi-Fi network manager 302.

FIG. 6 illustrates an embodiment of how the measurement data and the additional AP information collected by a plurality of managed-APs are further sent to Wi-Fi network manager 302. For example, managed-AP 502 sends the measurement data and the AP information at $t=T_0$, managed-AP 504 sends the measurement data and the AP information at $t=T_1$, managed-AP 506 sends the measurement data and the AP information at $t=T_2$, and so on.

Referring back to FIG. 4, at 408, adjustments to Wi-Fi parameters associated with one or more APs to optimize the Wi-Fi overall network performance are searched. As Wi-Fi network manager 302 receives measurement data and AP information from many APs, including APs installed in multiple Wi-Fi networks, the measurement data may be used by Wi-Fi network manager 302 to compute Wi-Fi parameters that can optimize network performance in a global sense, achieving superior network performance.

Different Wi-Fi parameters may be dynamically adjusted to optimize the Wi-Fi overall network performance. As will be described in greater detail below, Wi-Fi parameters that can be dynamically and optimally adjusted may include CSTs, channel allocation (channel bandwidth and channel assignment), transmit power, multiple-input multiple-output (MIMO) antenna parameters, backoff parameters, and the like. For example, instead of determining channel allocation and CST individually or locally, they can be optimized simultaneously in a global sense.

With continued reference to FIG. 4, at 410, at least some of the optimized adjustments to the one or more Wi-Fi parameters are transmitted to the one or more APs. The received adjustments may be used by the APs for self-configuration, self-optimization, and self-healing, such that the APs can collectively form a self-organizing network.

The received adjustments may be used to initialize an AP that has been recently installed. For example, after an AP is first installed, the AP collects initial measurement data and sends the data to Wi-Fi network manager 302. Wi-Fi network manager 302 then computes the parameters for the AP and sends them to the AP for self-configuration.

The received adjustments may be used to re-configure an existing AP. When the existing AP connects to Wi-Fi network manager 302 for the first time, the existing AP is treated as a new installation for the purpose of network optimization. Wi-Fi network manager 302 computes new parameters for the existing AP based on the received measurement data from the existing AP and other APs, and Wi-Fi network manager 302 sends the new parameters to the existing AP for reconfiguration.

The received adjustments may also be used to periodically update the Wi-Fi parameters of an existing AP. These adjustments are computed based on dynamic, real-time measurements made periodically by the APs.

The received adjustments may also be used by the APs for self-healing any network topology changes. For example, a network topology change may be caused by the failure of an AP. Wi-Fi network manager 302 detects the failure, and the parameters of the surrounding APs are automatically adjusted to fill in the resulting coverage hole. In another example, a network topology change may be caused by new APs being installed on a Wi-Fi network. The network topology change may be detected by Wi-Fi network manager 302, which is triggered by the detection to initiate a new search.

Figure 7:
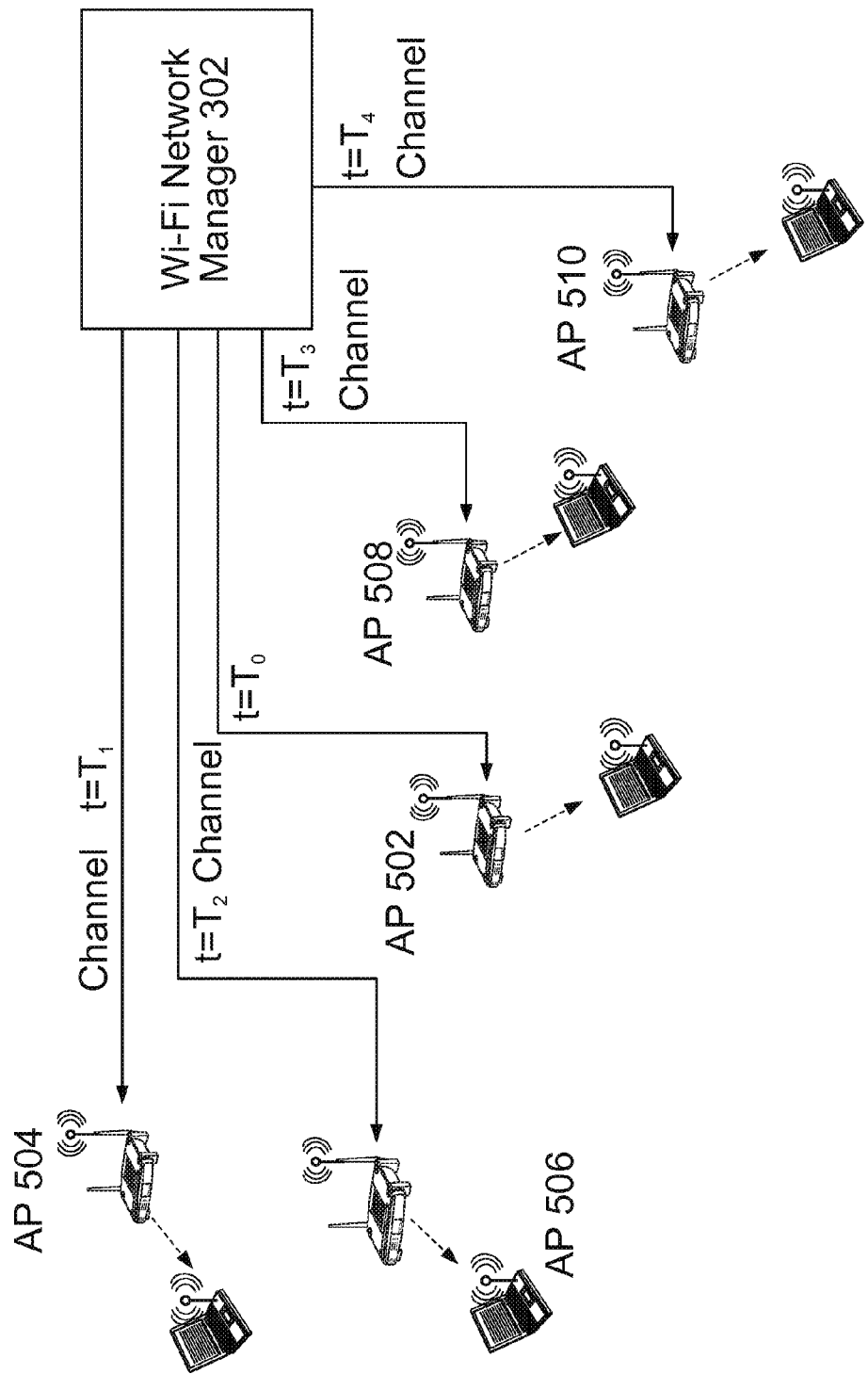
FIG. 7 illustrates an embodiment of how channel allocation adjustments are transmitted to the APs by Wi-Fi network manager 302.

FIG. 7 illustrates an embodiment of how channel allocation adjustments are transmitted to the APs by Wi-Fi network manager 302. For example, the channel allocation adjustments for managed-AP 502 are sent at $t=T_0$, the channel allocation adjustments for managed-AP 504 are sent at $t=T_1$, the channel allocation adjustments for managed-AP 506 are sent at $t=T_2$, and so on. After an AP receives the channel allocation adjustments, the AP can broadcast any new channel assignment to its associated clients via a channel switch announcement.

Adjustments to Wi-Fi parameters associated with one or more APs to optimize the Wi-Fi overall network performance can be determined by Wi-Fi network manager 302 based on conflict graphs representing the amount of conflicts between APs.

Figure 8:
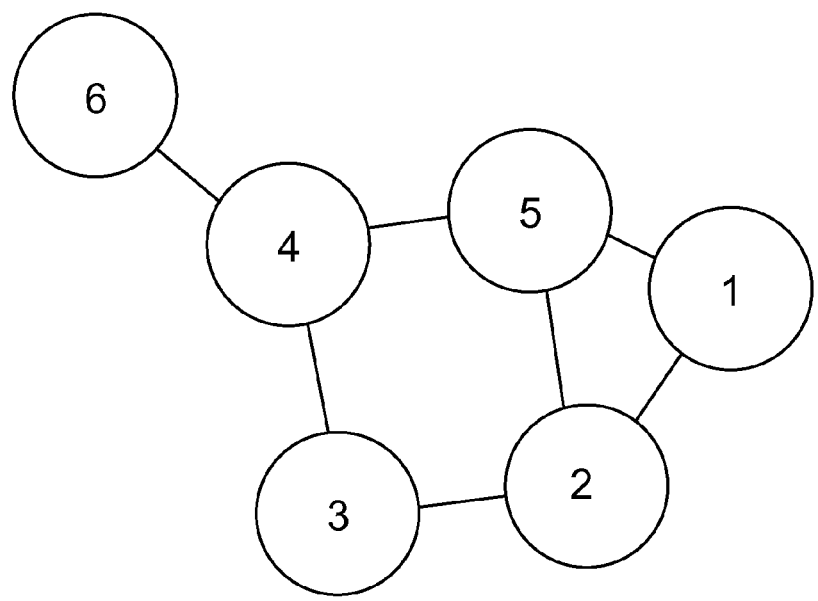
FIG. 8 illustrates an embodiment of a graph with six vertices and seven edges.

A graph is a representation of a set of objects where some pairs of objects are connected by links. The interconnected objects are represented by vertices, and the links that connect some pairs of vertices are called edges. The degree of a vertex is the number of edges that connect to the vertex. FIG. 8 illustrates an embodiment of a graph with six vertices and seven edges. In this example, the vertices with the highest degree are vertices 2, 4, and 5, each with a degree of 3.

Figure 9:
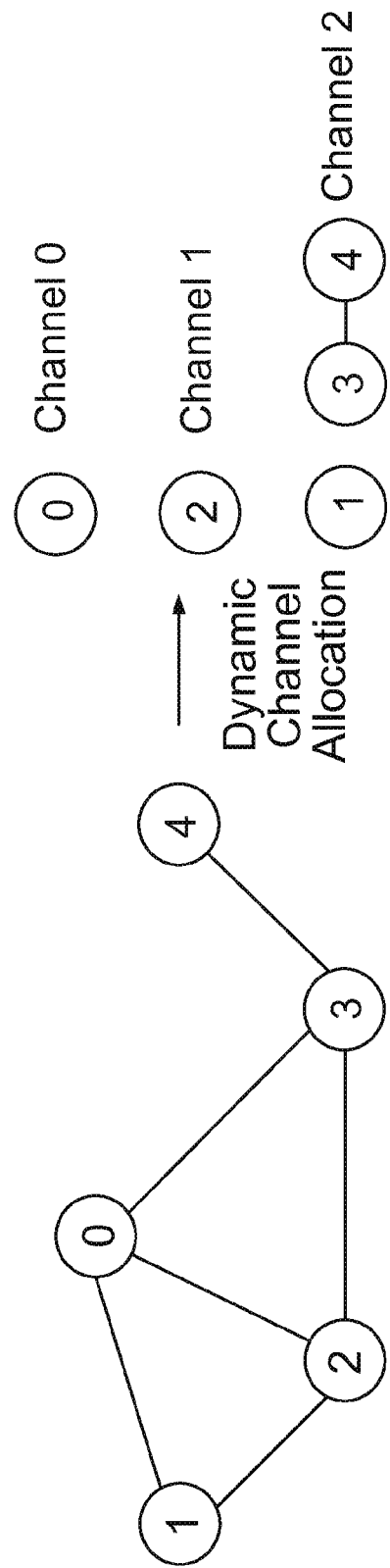
FIG. 9 illustrates that by reducing the degree of a particular AP through appropriate channel allocation, fewer devices from other BSSs share an edge with the AP/BSS, thereby increasing the number of transmission opportunities for the BSS.

In a conflict graph representing the amount of conflict between APs, each of the AP/BSS is represented by a vertex. An edge connects two APs if the BSSs of the two APs have an impact on the transmissions and performance of the other. By reducing the degree of a particular AP through Wi-Fi parameters adjustments, fewer devices from other BSSs would cause an impact on the AP and its BSS, thereby increasing the throughput and performance of the AP and its BSS. For example, as shown in FIG. 9, by reducing the degree of a particular AP through appropriate channel bandwidth and channel assignment, fewer devices from other BSSs share an edge with the AP/BSS, thereby increasing the number of transmission opportunities for the BSS. Since the amount of impact caused by different BSSs on a particular AP/BSS is not the same, the edges of the conflict graph are weighted based on a number of factors, as will be described in greater detail below. The Wi-Fi parameters are adjusted to minimize the total sum of the weighted degrees of the conflict graph using optimization techniques.

Figure 10:
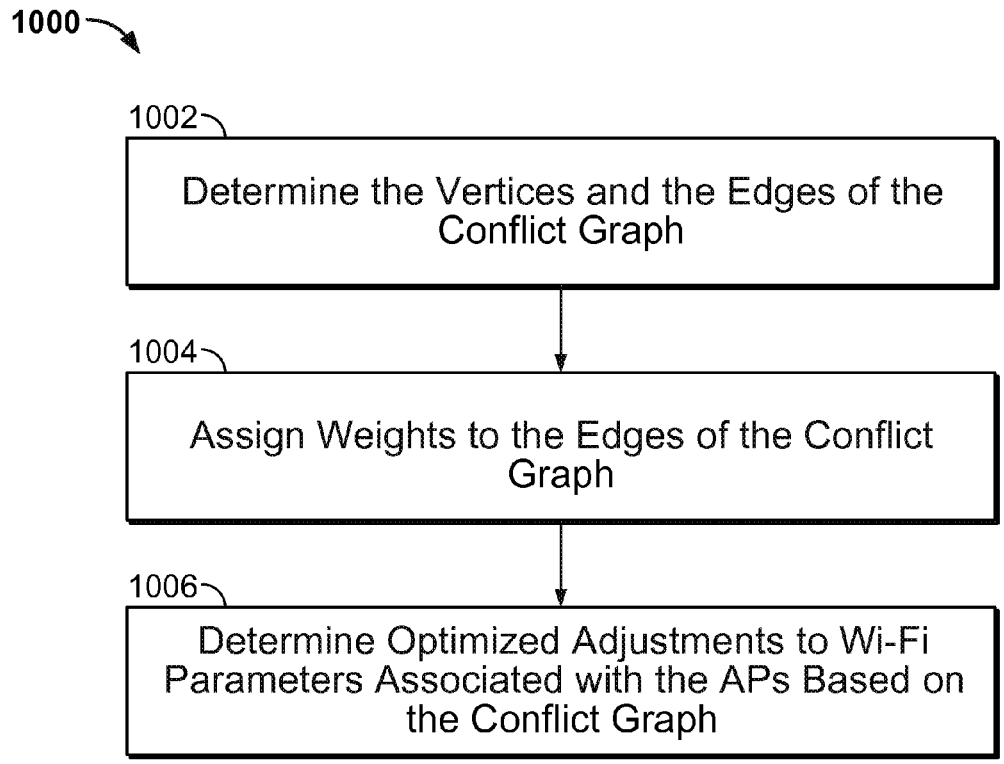
FIG. 10 illustrates an embodiment of a process 1000 for determining optimized adjustments to Wi-Fi parameters associated with one or more of the APs.

FIG. 10 illustrates an embodiment of a process 1000 for determining optimized adjustments to Wi-Fi parameters associated with one or more of the APs. In some embodiments, process 1000 is a process performing step 408 of FIG. 4.

At 1002, the vertices and the edges of the conflict graph are determined. Suppose there are n APs/BSSs in the network. Each of the AP/BSS is represented by a vertex in the conflict graph. With n APs, there are a total of $n^2$ relationships between each pair of APs. For each pair of APs, it is determined whether the BSSs of the two respective APs have an impact on the transmissions and performance of one other. Different criteria may be used for determining whether the BSSs have an impact on each other. In some embodiments, it is determined based on whether the BSSs can hear each other. In some embodiments, it is determined based on whether AP1 can decode packets from AP2 or whether AP2 can decode packets from AP1. In some embodiments, it is determined based on whether AP1 can decode packets from an client associated with AP2, or vice versa.

At 1004, weights are assigned to the edges of the conflict graph. The weights are determined based on a number of factors. In some embodiments, the factors are different types of conflicts between the APs/BSSs.

One type of conflict is the contention for resources. The amount of contention may be determined based on how many devices in BSS1 can hear from devices in BSS2: the greater the number of devices that can hear from each other, the greater the contention between the devices for the resources and medium. The amount of contention may also be determined based on whether or how often the devices in BSS1 need to back off from transmission because of transmissions of other devices in BSS2.

Another type of conflict is SINR conflict. SINR is signal-to-interference-plus-noise ratio, which is calculated as $SINR=P/(I+N)$, where P is signal power, I is interference power, and N is noise power. SINR can be used to measure the quality of wireless connections. Devices in one BSS may cause the devices in another BSS to have lower SINR. For example, if a device in BSS1 does not back off from transmission when a device in BSS2 is transmitting, then the device in BSS1 may cause higher interference to the transmission in BSS2. The higher the amount of interference, the lower is the SINR, and the lower are the throughput and performance. Thus, a higher weight may be assigned to an edge connecting two BSSs when one or more of the BSSs causes lower SINR to the other. Conversely, a lower weight may be assigned to an edge connecting two BSSs when neither of the BSSs causes degradation of SINR to each other beyond a predetermined threshold.

Figure 11:
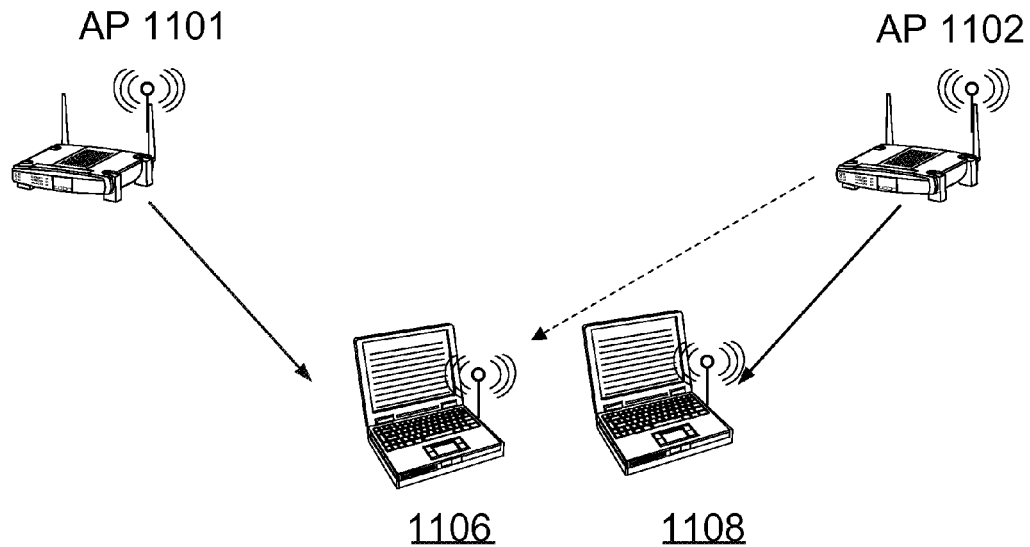
FIG. 11 illustrates an embodiment of hidden node detection.

One type of conflict is conflict caused by hidden nodes. FIG. 11 illustrates an embodiment of hidden node detection.

In FIG. 11, client 1106 is associated with AP 1101, while client 1108 is associated with AP 1102. AP 1101 cannot hear and decode packets from AP 1102, but client 1106 and AP 1102 can hear each other. Suppose AP 1102 begins to transmit first, and client 1106 can hear and decode the packets from AP 1102. Since AP 1101 cannot hear and decode packets from AP 1102, AP 1101 does not back off from transmission and begins to transmit to client 1106 as well. With both AP 1101 and AP 1102 transmitting at the same time and creating interference to each other, client 1106 will likely drop the packets from AP 1101. Here, AP 1102 is a hidden node when AP 1101 transmits to client 1106. A higher weight may be assigned to an edge connecting two APs when one or more of the APs is a hidden node to the other. Conversely, a lower weight may be assigned to an edge connecting two APs when neither of the APs is a hidden node to the other.

Hidden nodes may be detected by Wi-Fi network manager 302 because Wi-Fi network manager 302 can collect information regarding the APs (both managed-APs and non-managed-APs), their associated clients, and whether the APs and their clients can hear and decode packets from each other. For example, this information may be collected by Wi-Fi network manager 302 at step 406 of process 400 as described above. This information is not available when the APs are running in a distributed mode, without any centralized network manager to collect measurement data and other information from the APs, monitor their conditions, and manage their configurations.

Figure 12:
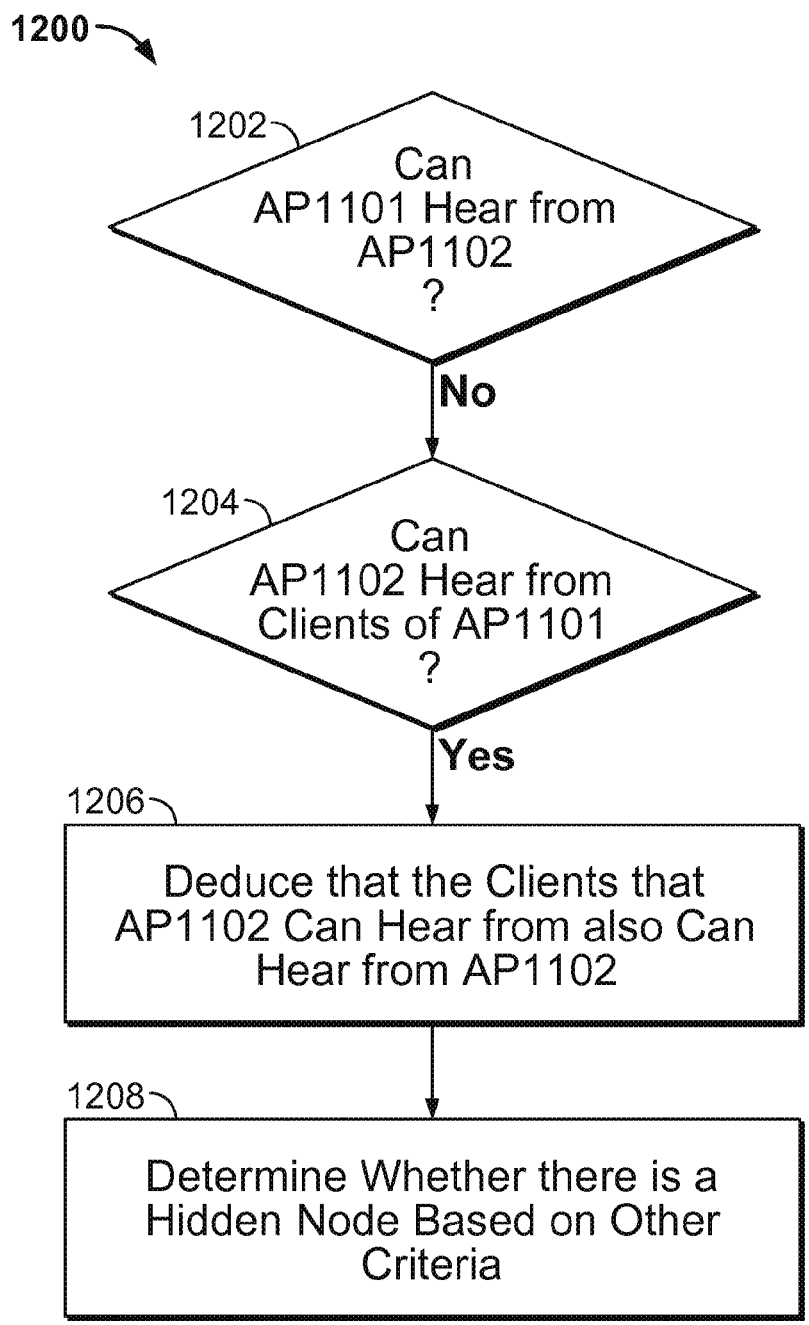
FIG. 12 illustrates an embodiment of a process 1200 for detecting a hidden node.

FIG. 12 illustrates an embodiment of a process 1200 for detecting a hidden node. At 1202, it is determined whether AP 1101 can hear and decode packets from AP 1102. The determination may be based on whether AP 1101 has sent any measurement data to Wi-Fi network manager 302 regarding packets being received from AP 1102 or not. Wi-Fi network manager 302 can distinguish a non-managed AP from a client based on whether beacon frames are decoded by the managed-APs or not. Beacon frames are transmitted by the AP in a BSS, but are not transmitted by the clients in the BSS.

At 1204, if AP 1101 cannot hear from AP 1102, then it is determined whether AP 1102 can hear from any clients of AP 1101. At 1206, if AP 1102 can hear from one or more clients of AP 1101, then Wi-Fi network manager 302 may deduce that one or more clients of AP 1101 can also hear from AP 1102 and further that a partial hearing of AP 1102 is detected in the BSS of AP 1101. In some embodiments, a hidden node is detected based on the detected partial hearing of AP 1102.

At 1208, additional criteria may be used to determine whether a hidden node is detected. In some embodiments, a hidden node is detected based further on whether the clients of AP 1101 can tolerate the interference from AP 1102 and whether the clients of AP 1102 can tolerate the interference from AP 1101. In some embodiments, a hidden node is detected based further on whether the traffic is mainly upstream (i.e., from clients to AP), mainly downstream (i.e., from AP to clients), or both.

In some embodiments, packet success/failure rates may be used to estimate whether a hidden node problem exists on a given channel before process 1200 is performed. For example, prior to process 1200, packet success and failure rates of the APs and clients may be monitored. If the packet failure rate is above a predetermined threshold, then process 1200 is used to further determine whether a hidden node exists. The additional step of monitoring the packet success/failure rates is useful in reducing the computation required for analyzing the packet information received from AP 1201 and AP 1202.

Another factor that can be used to determine the weight of an edge of the conflict graph is the load associated with an AP/BSS. When an AP is handling a greater amount of wireless traffic or load in the network, the AP experiences greater performance degradation in the presence of any types of the conflicts described above than an AP that is handling a lighter load. For example, when an AP is handling a relatively light load, the performance degradation caused by hidden nodes may be negligible. In another example, when an AP is handling a relatively light load, the level of contention may be insignificant even when the AP can hear from many devices from other BSSs. Therefore, a higher weight may be assigned to an edge connecting two BSSs when one or more of the BSSs have higher network loads. Conversely, a lower weight may be assigned to an edge connecting two BSSs when neither of the BSSs has heavy network loads. The load associated with an AP/BSS may be determined based on the number of clients associated with the AP, the number of packets, the duration of the packets sent in the BSS, and the like.

Another factor that can be used to determine the weight of an edge of the conflict graph is the backoff behavior of the devices within the network. For example, weight can be assigned based on which devices back off to whom, the number of such backoffs, the number of asymmetric backoffs where device A backs off to device B, but not vice versa.

An illustrative example of assigning weights to the edges of the conflict graph is given below:
1. If at least one device in first BSS backs off when another device in the second BSS transmits, or vice versa, then the conflict between the two BSS is assigned a weight of at least one.
2. If there is a hidden node with partial hearing of one of the following types, then the conflict between the two BSSs is assigned a weight of at least $w_1$:
   a. AP1 does not hear AP2 but client of AP1 hears AP2;
   b. AP2 does not hear AP1 but client of AP2 hears AP1;
   c. client of AP1 does not hear AP2 but AP1 hears AP2;
   d. client of AP2 does not hear AP1 but AP2 hears AP1.
3. If a device in one BSS does not back off to a device in the other BSS, but simultaneous transmissions by the two devices lead to a SINR less than a threshold in the second BSS, then assign the conflict a weight of $w_2$.

With continued reference to FIG. 10, at 1006, optimized adjustments to Wi-Fi parameters associated with the APs are determined based on the conflict graphs. The Wi-Fi parameters are adjusted to minimize the total sum of the weighted degrees across all the APs using optimization techniques.

Using dynamic channel allocation as an illustrative example, if there are M possible channels, M channel-specific conflict graphs as a function of channel allocation are obtained. Optimization techniques are used to minimize the sum of the weighted degrees across all the APs. For example, if an AP has 3 weighted edges, x, y, and z, then the weighted degrees of AP is x+y+z. The sum of the weighted degrees across all the APs is then minimized. The weighted edges of an AP are determined for the channel the AP is allocated to. When the APs can support different channel bandwidths, the dynamic channel allocation is performed for all possible combinations of channel bandwidths and channel assignments associated with the different APs. The choice of channel bandwidth assigned to each AP is then based on minimizing the sum of the weighted degrees across all the APs, where the weights will depend on the channel bandwidth along with other factors.

In some embodiments, the optimization further minimizes the maximum weighted degree of any AP residing on a given channel. For example, if two different channel allocations both result in the same total sum of the weighted degrees across all the APs, but the maximum weighted degree of any AP resulting from the first channel allocation is smaller than the second channel allocation, then the first channel allocation is selected. The advantage of minimizing the maximum weighted degree is that the APs will have more even and similar performance, instead of having some APs with superior performance and some APs with significantly worse performance. In some cases, relaxing the maximum weighted degree constraint may further minimize the sum of the weighted degrees across all the APs, at the expense of worsening the performance of some of the APs.

Figure 13:
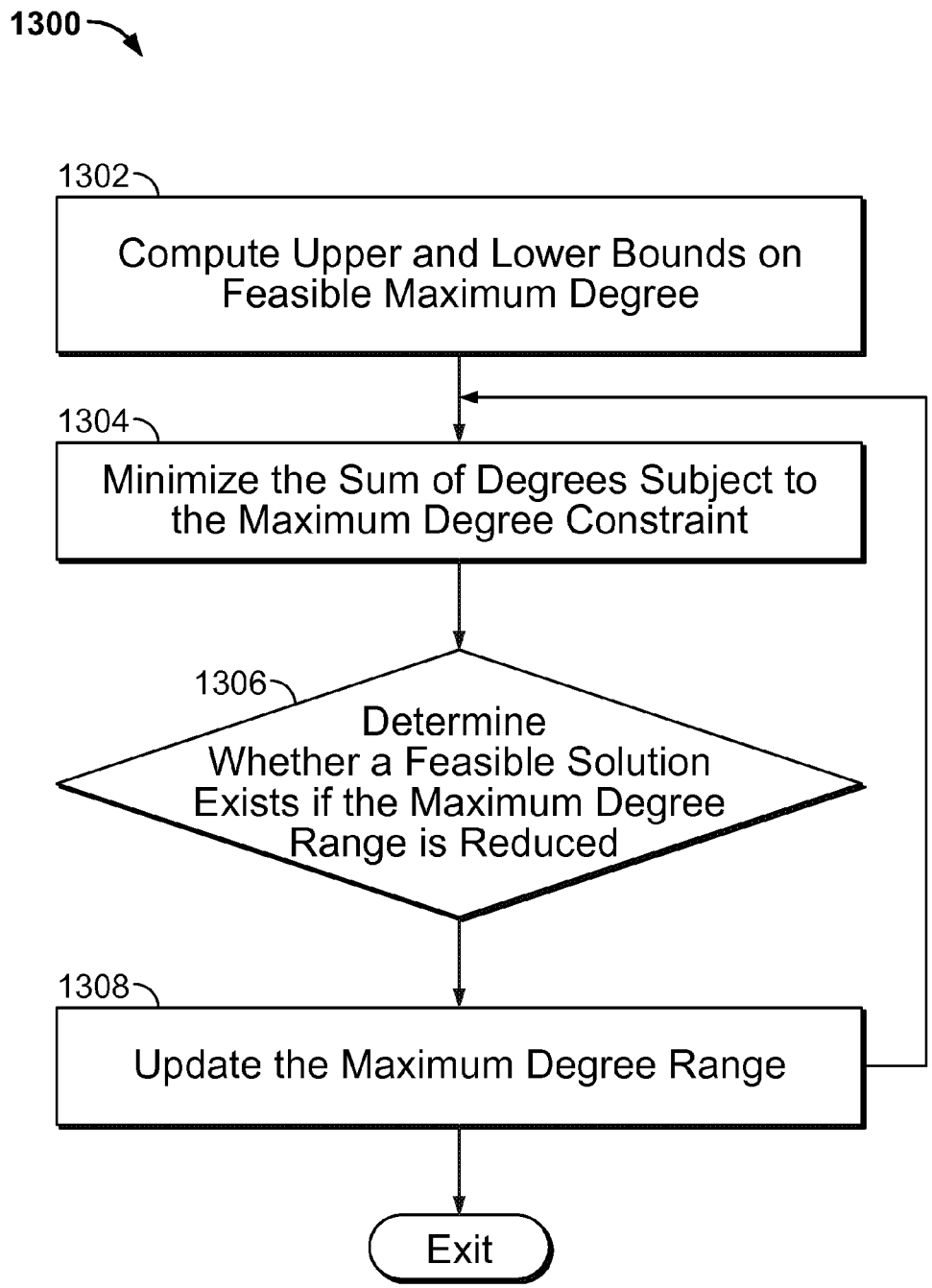
FIG. 13 illustrates an embodiment of a process 1300 for dynamically adjusting the Wi-Fi parameters of the APs using conflict graphs.

FIG. 13 illustrates an embodiment of a process 1300 for dynamically adjusting the Wi-Fi parameters of the APs using conflict graphs. In some embodiments, process 1300 is performed during step 1106 of FIG. 10. At 1302, the upper and lower bounds of a feasible maximum weighted degree are computed. At 1304, Wi-Fi parameters are adjusted such that the sum of the weighted degrees across all the APs is minimized subject to the maximum degree constraint. At 1306, it is determined whether a feasible solution exists if the maximum weighted degree range is reduced. If a feasible solution is available, then the maximum weighted degree range is reduced and step 1304 is repeated again. Otherwise, process 1300 is terminated.

Figure 14:
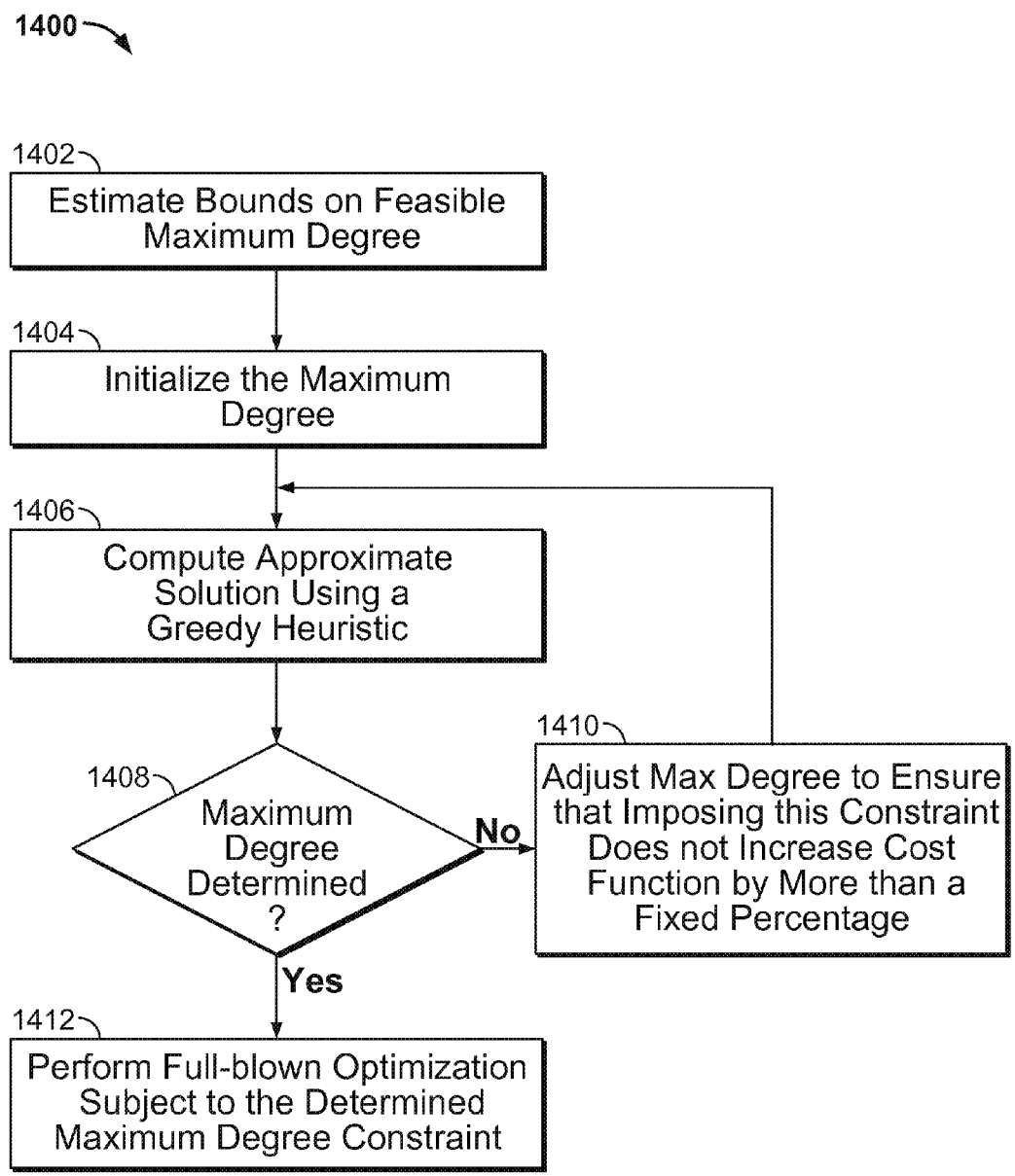
FIG. 14 illustrates an embodiment of a process 1400 for dynamically adjusting the Wi-Fi parameters of the APs using conflict graphs.

FIG. 14 illustrates an embodiment of a process 1400 for dynamically adjusting the Wi-Fi parameters of the APs using conflict graphs. In some embodiments, process 1400 is performed during step 1106 of FIG. 10. At 1402, the upper and lower bounds of a feasible maximum weighted degree are computed. At 1404, a maximum weighted degree candidate is initialized to a value within the upper and lower bounds. At 1406, an approximation solution to the optimization problem is computed using a greedy heuristic. The approximation solution is obtained subject to the maximum weighted degree constraint. A greedy algorithm is an algorithm that follows the problem solving heuristic of making the locally optimal choice at each stage with the hope of finding a global optimum. In many problems, a greedy strategy does not in general produce an optimal solution, but nonetheless a greedy heuristic may yield locally optimal solutions that approximate a global optimal solution in a reasonable time. If the approximate solution obtained at step 1406 indicates that the current maximum degree candidate will likely yield a set of Wi-Fi parameters that are close to the optimum, then the maximum degree is determined, and a full-blown optimization is performed subject to the maximum degree constraint at 1412. Otherwise, at 1410, the maximum degree candidate is adjusted to ensure that imposing this constraint does not increase the cost function by more than a fixed percentage. An approximation solution to the optimization problem is again computed using the greedy heuristic at 1406. Steps 1406, 1408, and 1410 are repeated until a maximum degree is determined. With the determined maximum degree, a full-blown optimization is performed subject to the maximum degree constraint at 1412.

The full-blown optimization performed at 1412 may be any optimization technique. For example, mixed integer linear programming techniques may be used. Linear programming is a mathematical method for determining a way to achieve the best outcome in a given mathematical model for some list of requirements represented as linear relationships. FIG. 15 illustrates one embodiment of mixed integer linear programming that can be used to minimize the total sum of the weighted degrees of the conflict graph by dynamically adjusting the channel allocation of the APs.

Different Wi-Fi parameters may be dynamically adjusted using the aforementioned techniques to optimize the Wi-Fi overall network performance. In addition to channel allocation, the aforementioned techniques may be used for transmit power control, CST adjustment, and so on. In some embodiments, a few types of Wi-Fi parameters may be adjusted jointly, e.g., channel allocation may be performed jointly with power control, and power control jointly with CST.

Figure 16:
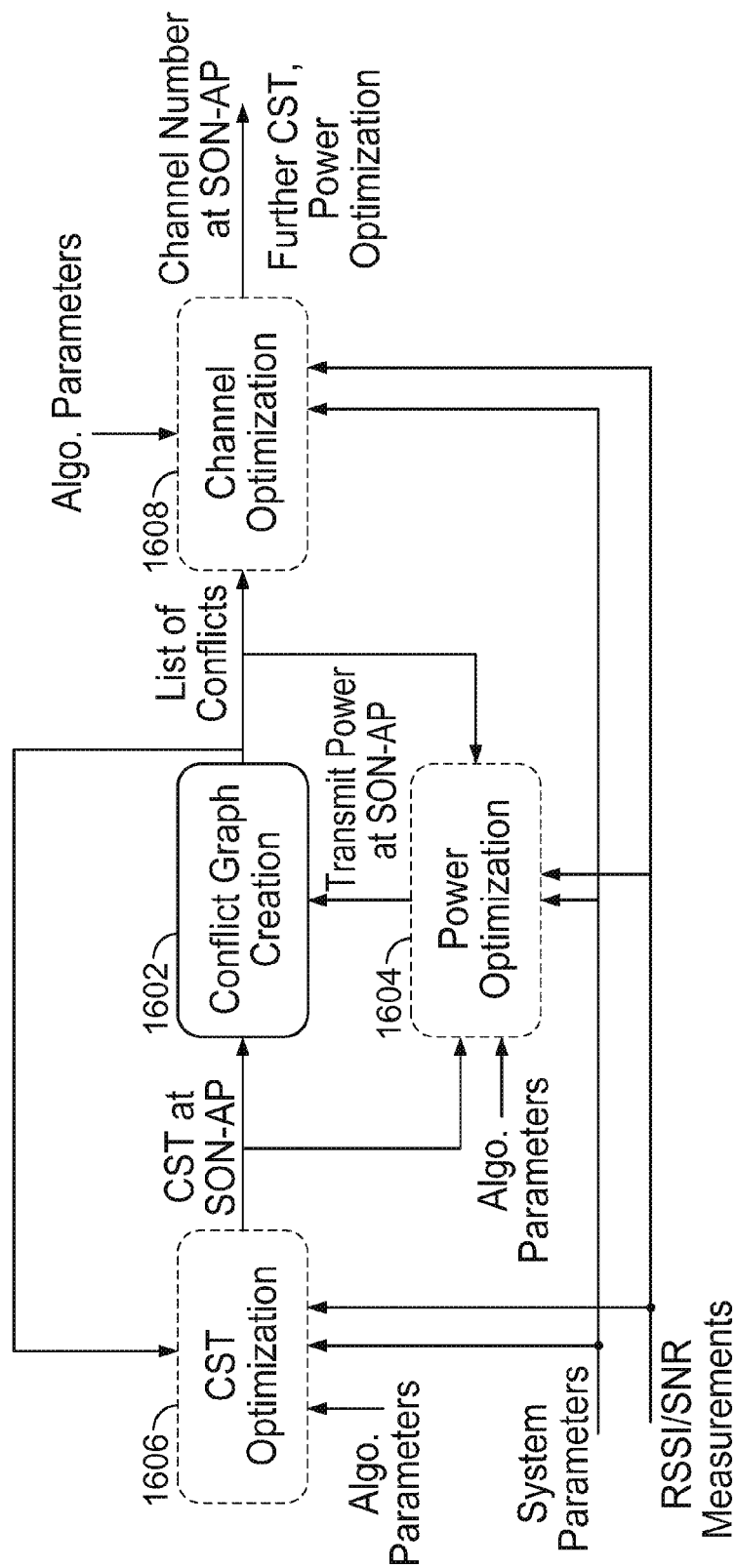
FIG. 16 illustrates an embodiment of a system for joint optimization of power control, channel allocation, and CST control using conflict graphs.

FIG. 16 illustrates an embodiment of a system for joint optimization of power control, channel allocation, and CST control using conflict graphs. Conflict graph creation block 1602 creates conflict graphs and a list of conflicts based on various inputs, including inputs from the power optimization block 1604 and the CST optimization block 1606. The conflict graphs and the list of conflicts are then fed into the channel optimization block 1608 for channel allocation. After channel optimization, the channel allocation output is further fed back into the system again for further CST and power optimization.

An illustrative example of dynamically adjusting the transmit power of the APs is given below:
1. Set power for APX based on a common parameter p for all APs in the network. For example:
    a. all the APs are set to the same power; or
    b. an AP's power can be determined as p+a PL, where 0<a<1 is a constant and PL is the path loss of the client furthest away from the AP.
2. Compute the following statistics for the conflict graph for different values of p (note that the set of conflicts and weights change as a function of the power levels):
    a. Total number of conflicts;
    b. Number of hidden node conflicts;
    c. Number of SINR conflicts;
    d. Number of device pairs where one device backs off to a second one, but not vice versa.
3. Select a value of p which minimizes a cost function of the above parameters and/or imposes a bound on each of the quantities above.

An illustrative example of joint channel and power optimization of the APs is given below:
1. Set the power for APX based on a common parameter p for all APs in the network.
2. For different values of p, compute the conflict graph and use a greedy channel allocation heuristic to compute the following statistics for the resulting channel allocation:
    a. Total number of conflicts;
    b. Number of hidden node conflicts;
    c. Number of SINR conflicts;
    d. Number of device pairs where one device backs off to a second one, but not vice versa.
3. Select a value of p which minimizes a cost function of the above parameters and/or imposes a bound on each of the quantities above.

An illustrative example of dynamically adjusting the CST of the APs is given below:
1. Set CST for APX based on a common parameter p for all APs in the network. For example,
    a. all the APs are set to the same CST
    b. an AP's CST can be determined as AP_TX_power-PL-p, where PL is the path loss of the client furthest away from the AP, and AP_TX_power is the transmission power of the AP
2. Compute the following statistics for the conflict graph for different values of p:
    a. Total number of conflicts;
    b. Number of hidden node conflicts;
    c. Number of SINR conflicts;

d. Number of device pairs where one device backs off to a second one, but not vice versa.

3. Select a value of p which minimizes a cost function of the above parameters and/or imposes a bound on each of the quantities above.

Figure 17:
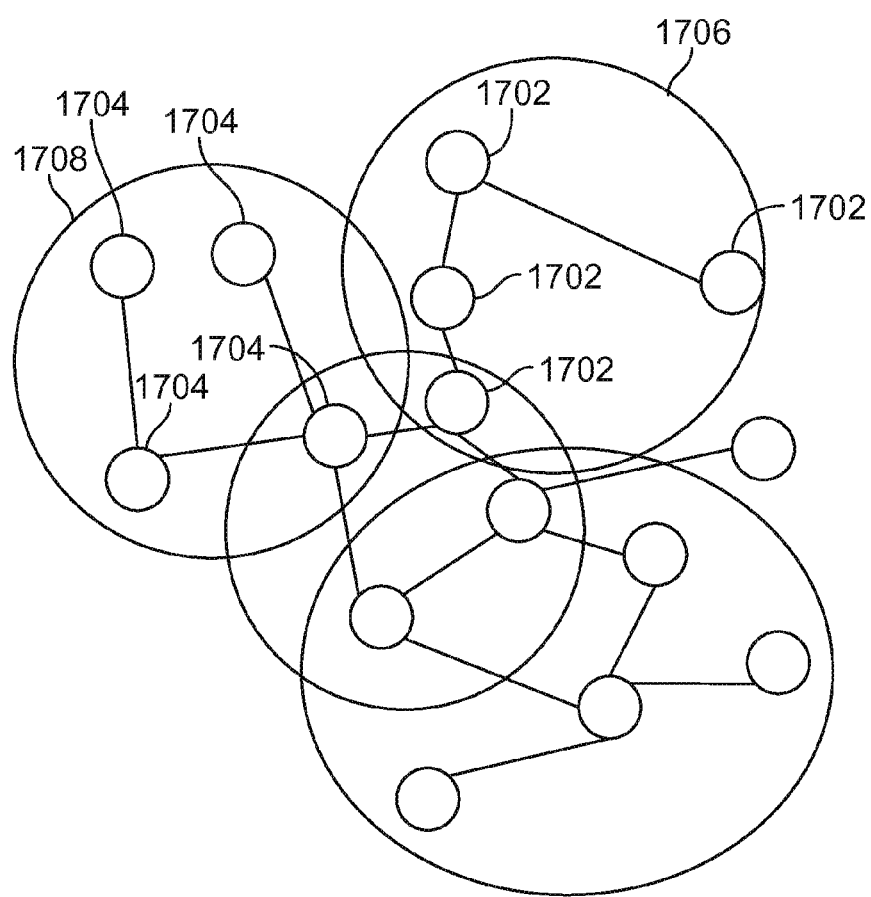
FIG. 17 illustrates that APs may be divided into a plurality of local neighborhoods for local optimization.

In some embodiments, in addition to global optimization, local neighborhoods may be created for local optimization. FIG. 17 illustrates that APs may be divided into a plurality of local neighborhoods for local optimization. As shown in FIG. 17, APs 1702 within a localized region 1706 are grouped together for local optimization. Similarly, APs 1704 within another localized region 1708 are grouped together for local optimization. A local optimization may be performed prior to a global optimization across the entire network. The local optimization has a lower computational complexity, and it avoids changing parameters across the entire network at the same time. Conversely, the global optimization avoids local minima that may arise when only local parameters within a neighborhood are accounted for in the local optimization.

Local optimization may be triggered by network topology or network condition changes to re-optimize the Wi-Fi parameters of a localized region. For example, an AP in a localized region may fail or a new AP may be installed in the localized region. Local optimization may also be triggered periodically by a timer to re-optimize the Wi-Fi parameters of a localized region.

Global optimization may be triggered by more significant network topology or network condition changes to re-optimize the Wi-Fi parameters of the entire network. It can also be triggered periodically but less frequently than local optimizations. In general, a global optimization is triggered when it is determined that the re-optimization will likely result in significant improvement in performance. The selection between global optimization versus local optimization is based on different factors, including the number of Wi-Fi parameter changes, computational complexity, performance gain, and the like.

In some embodiments, a local optimization may be initiated by Wi-Fi network manager 302. In some embodiments, a local optimization may be initiated and performed by an AP that is selected as a local controller within a localized region. In some embodiments, a local optimization may be initiated and performed by a new AP. In a local optimization, only a portion of the conflict graph corresponding to the entire network is updated. The update is based on measurement data received from a portion of the APs.

Figure 18:
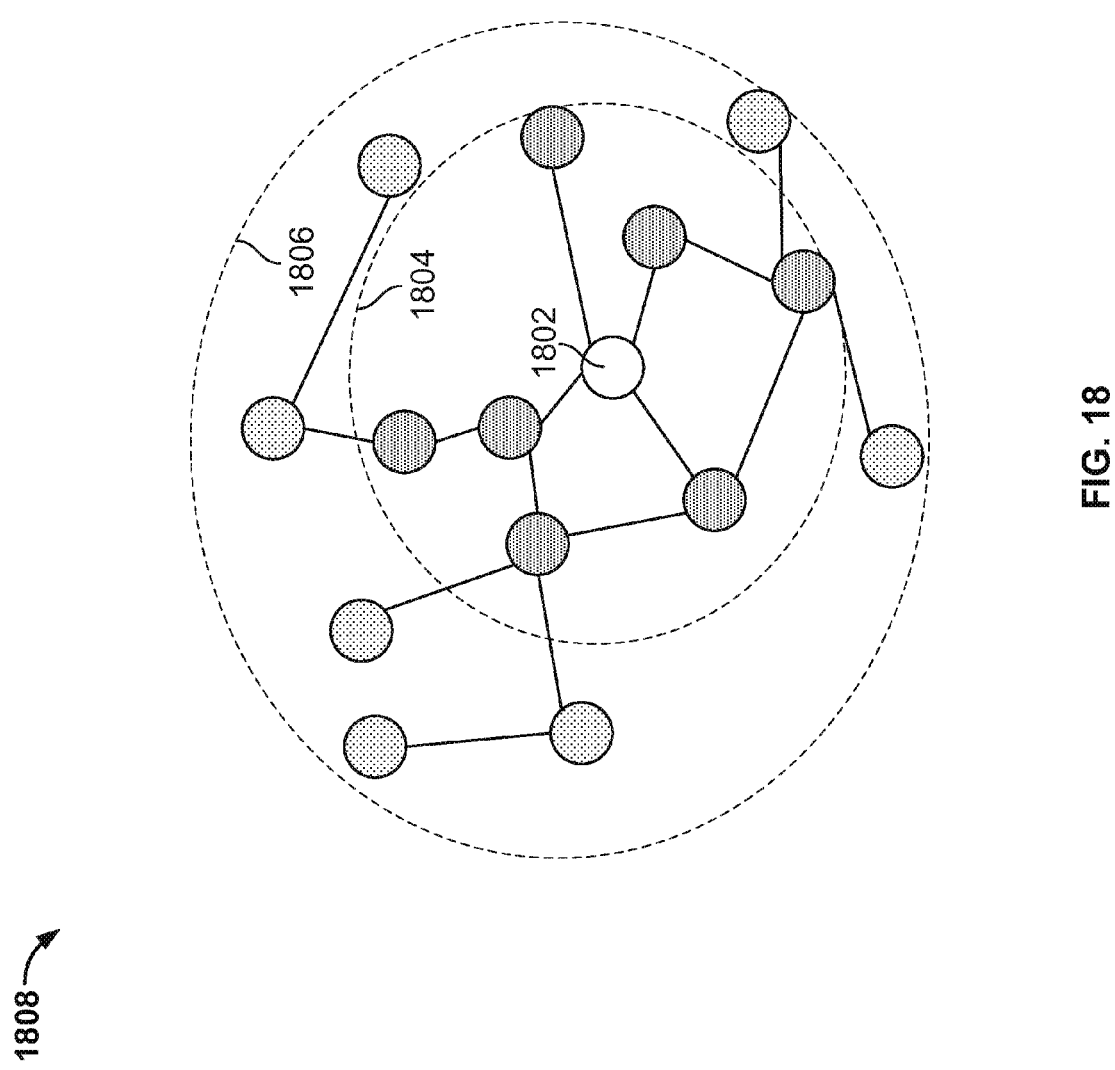
FIG. 18 illustrates one embodiment of a plurality of zones for local optimization.

In some embodiments, a local optimization re-optimizes the Wi-Fi parameters of the APs within a first zone, and takes into account the performance of some of the APs in the network within a second zone, but does not take into account the performance of the APs beyond the second zone. FIG. 18 illustrates one embodiment of a plurality of zones for local optimization. During a local optimization, the performance of the APs in the first zone 1804 and the second zone 1806 are taken into account, but only the Wi-Fi parameters of APs in the first zone 1804 are re-optimized and re-configured. In some embodiments, the division of the zones may be based on a distance from a center point of the local optimization, or based on the number of hop counts away from a center point of the local optimization. For example, the center point of the local optimization may be a new AP or a failed AP. FIG. 18 illustrates that the first zone 1804 is defined as APs that are within two hops from the center point 1802, and the second zone 1806 is defined as APs that are 3 hops away, and the third zone 1808 is defined as APs that are more than 3 hops away. In this example, the portion of the conflict graph that is updated may include APs/BSSs corresponding to zone 1806.

In some embodiments, the division of the zones is based on a heuristic. For example, the heuristic may determine the first zone to include the APs having performance below a predetermined performance target level. In another example, the heuristic may determine the first zone to include the APs with the most performance degradation within a time interval.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of dynamically adjusting Wi-Fi parameters of a plurality of access points (APs), comprising:
   receiving reports from the plurality of APs through an interface;
   creating a conflict graph by a processor, comprising:
      creating a plurality of vertices of the conflict graph, each vertex corresponding to one of the plurality of APs;
      determining that there is a conflict between at least some of the pairs of APs based at least in part on the received reports;
      connecting an edge between each of the at least some of the pairs of APs;
      assigning a weight to each of the edges of the conflict graph; and
      storing the conflict graph in a memory; and
   searching for adjustments to a plurality of Wi-Fi parameters that minimize a function of the weighted edges of the conflict graph using an optimization technique, wherein the search is subject to a maximum weighted degree constraint, wherein the maximum weighted degree constraint limits the weighted degree of each AP to a predetermined threshold, wherein the maximum weighted degree constraint is determined based at least in part on a greedy heuristic, wherein the determination of the maximum weighted degree constraint comprises:
      initializing the maximum weighted degree constraint to a value within a lower bound and an upper bound; and
      iteratively searching for adjustments to the plurality of Wi-Fi parameters that approximately minimize the function of the weighted edges of the conflict graph using the greedy heuristic and adjusting the maximum weighted degree constraint based on results of the greedy heuristic.

2. The method of claim 1, wherein the weight is assigned based at least in part on a degree of contention for resources between a pair of APs.

3. The method of claim 1, wherein the weight is assigned based at least in part on a degradation of signal-to-interference-plus-noise ratio (SINR) caused by a first AP to a second AP.

4. The method of claim 1, wherein the weight is assigned based at least in part on whether a first AP is a hidden node with respect to a second AP.

5. The method of claim 1, wherein the weight is assigned based at least in part on a load associated with an AP.

6. The method of claim 1, wherein the weight is assigned based on backoff behaviors between APs and their clients.

7. The method of claim 1, wherein the weight is assigned based on the channel bandwidth assigned to an AP.

8. The method of claim 1, wherein the function comprises a sum of the weighted edges of the conflict graph.

9. The method of claim 1, wherein the plurality of Wi-Fi parameters comprises one or more of the following: transmit power parameters, channel allocation parameters, carrier sense threshold (CST) parameters, and multiple-input multiple-output (MIMO) antenna parameters.

10. The method of claim 9, wherein the plurality of Wi-Fi parameters are jointly optimized.

11. The method of claim 9, wherein the plurality of Wi-Fi parameters comprises CST parameters, and wherein the adjustments to the CST parameters are further based on one or more of the following: SINR, AP density, client data requirements, and propagation conditions of APs sharing the same channel.

12. The method of claim 1, wherein a report received from an AP comprises measurement data collected by the AP, the measurement data comprising one or more of the following: receive signal strength indication (RSSI) of packets sent by another AP or another client, noise level of packets sent by another AP or another client, and signal-to-noise ratio (SNA) of packets sent by another AP or another client.

13. The method of claim 1, wherein a report received from an AP comprises information corresponding to the AP, the information comprising one or more of the following: a MAC address of the AP, a current channel assigned to the AP, load information of the AP, and MAC addresses of clients associated with the AP.

14. A system for dynamically adjusting Wi-Fi parameters of a plurality of access points (APs), comprising:
an interface configured to receive reports from the plurality of APs;
a processor configured to:
create a conflict graph, comprising:
creating a plurality of vertices of the conflict graph, each vertex corresponding to one of the plurality of APs;
determining that there is a conflict between at least some of the pairs of APs based at least in part on the received reports;
connecting an edge between each of the at least some of the pairs of APs; and
assigning a weight to each of the edges of the conflict graph; and
search for adjustments to a plurality of Wi-Fi parameters that minimize a function of the weighted edges of the conflict graph using an optimization technique, wherein the search is subject to a maximum weighted degree constraint, wherein the maximum weighted degree constraint limits the weighted degree of each AP to a predetermined threshold, wherein the maximum weighted degree constraint is determined based at least in part on a greedy heuristic, wherein the determination of the maximum weighted degree constraint comprises:
initializing the maximum weighted degree constraint to a value within a lower bound and an upper bound; and
iteratively searching for adjustments to the plurality of Wi-Fi parameters that approximately minimize the function of the weighted edges of the conflict graph using the greedy heuristic and adjusting the maximum weighted degree constraint based on results of the greedy heuristic; and
a memory coupled to the processor and configured to provide the processor with instructions.

15. The system of claim 14, wherein the weight is assigned based at least in part on a degree of contention for resources between a pair of APs.

16. The system of claim 14, wherein the weight is assigned based at least in part on a degradation of signal-to-interference-plus-noise ratio (SINR) caused by a first AP to a second AP.

17. The system of claim 14, wherein the weight is assigned based at least in part on whether a first AP is a hidden node with respect to a second AP.

18. The system of claim 14, wherein the weight is assigned based at least in part on a load associated with an AP.

19. The system of claim 14, wherein the weight is assigned based on backoff behaviors between APs and their clients.

20. The system of claim 14, wherein the weight is assigned based on the channel bandwidth assigned to an AP.

21. The system of claim 14, wherein the function comprises a sum of the weighted edges of the conflict graph.

22. The system of claim 14, wherein the plurality of Wi-Fi parameters comprises one or more of the following: transmit power parameters, channel allocation parameters, carrier sense threshold (CST) parameters, and multiple-input multiple-output (MIMO) antenna parameters.

23. The system of claim 22, wherein the plurality of Wi-Fi parameters are jointly optimized.

24. The system of claim 22, wherein the plurality of Wi-Fi parameters comprises CST parameters, and wherein the adjustments to the CST parameters are further based on one or more of the following: SINR, AP density, client data requirements, and propagation conditions of APs sharing the same channel.

25. The system of claim 14, wherein a report received from an AP comprises measurement data collected by the AP, the measurement data comprising one or more of the following: receive signal strength indication (RSSI) of packets sent by another AP or another client, noise level of packets sent by another AP or another client, and signal-to-noise ratio (SNA) of packets sent by another AP or another client.

26. The system of claim 14, wherein a report received from an AP comprises information corresponding to the AP, the information comprising one or more of the following: a MAC address of the AP, a current channel assigned to the AP, load information of the AP, and MAC addresses of clients associated with the AP.

27. A computer program product for dynamically adjusting Wi-Fi parameters of a plurality of access points (APs), the computer program product being embodied in a non-transitory computer readable storage medium and comprising computer instructions for:
receiving reports from the plurality of APs;
creating a conflict graph, comprising:
creating a plurality of vertices of the conflict graph, each vertex corresponding to one of the plurality of APs;
determining that there is a conflict between at least some of the pairs of APs based at least in part on the received reports;
connecting an edge between each of the at least some of the pairs of APs;
assigning a weight to each of the edges of the conflict graph; and
storing the conflict graph; and
searching for adjustments to a plurality of Wi-Fi parameters that minimize a function of the weighted edges of the conflict graph using an optimization technique, wherein the search is subject to a maximum weighted degree constraint, wherein the maximum weighted degree constraint limits the weighted degree of each AP to a predetermined threshold, wherein the maximum weighted degree constraint is determined based at least in part on a greedy heuristic, wherein the determination of the maximum weighted degree constraint comprises:
initializing the maximum weighted degree constraint to a value within a lower bound and an upper bound; and iteratively searching for adjustments to the plurality of Wi-Fi parameters that approximately minimize the function of the weighted edges of the conflict graph using the greedy heuristic and adjusting the maximum weighted degree constraint based on results of the greedy heuristic.

\* \* \* \* \*

UNITED STATES PATENT AND TRADEMARK OFFICE
CERTIFICATE OF CORRECTION

PATENT NO. : 9,131,391 B2  
APPLICATION NO. : 13/958853  
DATED : September 8, 2015  
INVENTOR(S) : Madan et al.

Page 1 of 1

It is certified that error appears in the above-identified patent and that said Letters Patent is hereby corrected as shown below:

TITLE PAGE

In Page 2, Item 56, References cited, Other publications, Citation no. 6, after "IEEE", delete "Transcations" and insert --Transactions--, therefor.

Signed and Sealed this  
Fifth Day of July, 2016

Michelle K. Lee  
*Director of the United States Patent and Trademark Office*